3,397,204
PRODUCTION OF HALOHYDROCARBYLOXY-
SYM-TRIAZINES
Van R. Gaertner, Ballwin, Mo., assignor to Monsanto
Company, St. Louis, Mo., a corporation of Delaware
No Drawing. Continuation-in-part of application Ser. No.
192,986, May 7, 1962. This application Oct. 21, 1965,
Ser. No. 500,343
5 Claims. (Cl. 260—248)

ABSTRACT OF THE DISCLOSURE

A process for preparing (halohydrocarbyloxy)-sym-triazines particularly useful as sizing agents for paper and textile waterproofing agents comprising reacting an epoxide or ether or thioether epoxide with a cyanuryl halide and recovering the resulting (halohydrocarbyloxy)-sym-triazine having halogen atoms bonded to the ring carbon atoms. Friedel-Crafts catalyst are useful in a process. A suitable temperature range is 25 to 150 degrees centigrade for the reaction period.

---

This application is a continuation-in-part of copending application Ser. No. 192,986, filed May 7, 1962, now U.S. Patent No. 3,314,325 issued Oct. 26, 1965.

This invention relates to organic ring compounds containing nitrogen and chlorine, and more particularly provides a process for preparing halogenated symmetrical triazine compounds with halogen-containing hydrocarbon and halogen-containing hydrocarbon ether groups as substituents therein.

An object of this invention is to provide a method for preparing (halohydrocarbonyloxy)-sym-triazines having halogen atoms bonded to the ring carbon atoms.

Other objects, advantages, and aspects of this invention will appear from the description hereinafter.

According to this invention there is provided a process for preparing new compounds having a general formula selected from the group consisting of

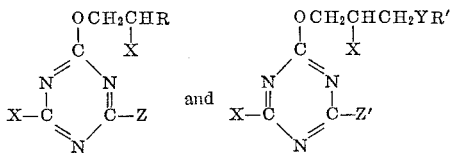

wherein R is selected from the group consisting of hydrogen, alkyl radicals having from 1 to 22 carbon atoms, aryl radicals having from 6 to 12 carbon atoms, and aralkyl and alkaryl radicals having from 7 to 24 carbon atoms; Y is a chalcogen element having an atomic weight from 16 to 33, i.e., oxygen or sulfur, R' is selected from the group consisting of alkyl radicals of from 1 to 22 carbon atoms, aryl radicals having 6 to 12 carbon atoms, and alkaryl radicals and aralkyl radicals having from 7 to 24 carbon atoms, X is a halogen, preferably chlorine or bromine; Z is selected from the group consisting of X, and the radical

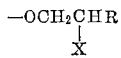

wherein X and R are as above defined; Z' is selected from the group consisting of X and the radical

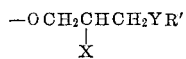

wherein X, Y and R' are as above defined.

The preferred compounds prepared by the process of this invention are those having one radical of the type

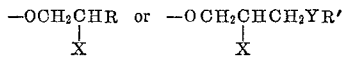

attached to one of the carbon atoms of the symmetrical triazine ring. The number of such radicals on the carbon atoms of the triazine ring can be varied from one to two so that when there is present only one such radical bonded to carbon there will be a halogen atom linked to each of the remaining 2 carbon atoms of the triazine ring. Likewise, when two such radicals are linked to the carbon atoms of the triazine ring there will be one halogen atom linked to the remaining carbon atom of the triazine ring. In preparing the halohydrocarbyloxy halogen-substituted symmetrical triazines a cyanuryl halide, that is, a compound of the formula

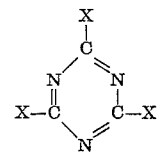

wherein X is as above defined, is reacted with an epoxide having a formula selected from the group consisting of

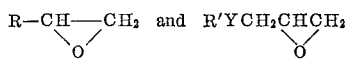

wherein R, R', and Y are as above defined, in sufficient quantity to replace at least one but not more than 2 of the hydrogen atoms linked to the carbon atoms of the triazine ring with the respective halohydrocarbyloxyl radicals derived from the respective epoxides used. For example by reacting 2,4,6-trichloro-sym-triazine with sufficient propylene oxide to react with and replace one chlorine atom, there is obtained as product, 2,4-dichloro-6-(2-chloropropoxy)-sym-triazine. Similarly by reacting 2,4,6-tribromo-sym-triazine with 1 molar equivalent of 3-octadecyloxy-1,2-epoxypropane there is obtained as product 2,4-dibromo-6-(2-chloro -3 - octadecyloxypropoxy)-sym-triazine.

In preparing compounds of the type described above the cyanuryl halide is reacted with a sufficient amount of an epoxide to replace from 1 to 2 halogen atoms from the carbon atoms of the triazine ring; preferably on the average of one such halogen is replaced by reaction with the epoxide when the compounds are intended for use in reactive sizing compositions, that is, in sizing compositions wherein the active ingredient of said composition chemically reacts with the substrate to impart sizing qualities thereto and become a part of the substrates chemical structure.

It is also within the scope of this invention to replace two halogen atoms in the trihalo-sym-triazine with two different halohydrocarbyloxyl radicals by replacing the halogens one at a time, as above, with two different epoxide reactants. Thus by following the route indicated in the above paragraph and replacing one halogen atom by reacting one mole of an epoxide with one mole of the trihalo-sym-triazine, and then adding an additional mole of a different epoxide compound to replace a second halogen atom, the reaction products can be varied extensively. For example by reacting 2,4,6-trichloro-sym-triazine with one mole of 1,2-butylene oxide until reaction is complete, and then with 1 mole of epichlorohydrin, 2-chloro-4-(2-chlorobutoxy)-6(2,3-dichloropropoxy) - sym-triazine can be obtained.

Examples of cyanuryl halide reactants, that is, halogenated sym-triazines which can be used in the process of this invention are, for example, 2,4,6-trichloro-sym-triazine, 2,4,6-tribromo-sym-triazine, and mixed chloro-bromo-sym-triazines such as 2-chloro-4,6-dibromo-sym-triazine.

One type of epoxide that may be used in the process of this invention is a glycidyl ether of the formula

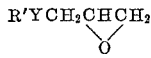

wherein R′ and Y are as above defined. Examples of such compounds are those wherein R′ is an alkyl, aryl, alkaryl or aralkyl radical having a total of up to 24 carbon atoms in either a straight chain or branch chain arrangement. Illustrative examples of some alkyl radicals include the methyl, ethyl, propyl, isopropyl, butyl, amyl, hexyl, 2-methylhexyl, heptyl, octyl, 2-ethylhexyl, isononyl, n-dodecyl, tert-dodecyl, 2-propylheptyl, 5-ethylnonyl, 2-butyloctyl, n-tetradecyl, n-pentadecyl, tert-octadecyl, eicosyl, docosyl, tetracosyl, 2,6,8-trimethylnonyl, and 7-ethyl-2-methyl-4-undecyl radicals. An especially valuable class of alkyl radical is that derived from an olefin monomer, dimer, trimer, tetramer, pentamer or the like, carbon monoxide, and hydrogen according to the "oxo" process. Such alkyl radicals include branch-chained tridecyl radicals from propylene tetramer or butylene trimer, the branch-chain decyl radicals derived from propylene trimer, the branch-chained hexadecyl radicals derived from propylene pentamer, and the branch-chained nonyl radical derived from diisobutylene. Aryl radicals include phenyl, tolyl, naphthyl, biphenylyl, etc. The alkaryl radicals can include the monoalkylated as well as the polyalkylated aryl radicals. The monocyclic and dicyclic aryl radicals are preferred. Illustrative examples of some radicals which can be used include tolyl, benzyl, dimethylphenyl, 2-phenylethyl, propylphenyl, tert-octylphenyl, naphthylmethyl, amylphenol, heptylphenyl, nonylphenyl, 2-ethylheptylphenyl, decylphenyl, 4-tert-dodecylphenyl, 2-tridecylphenyl, 3-tert-octadecylphenyl, 2-nonyl-1-naphthyl, beta-1-(2-butyloctyl)-2-naphthyl, 3-butylphenyl, and 2,4-dinonylphenyl radicals.

Illustrative examples of some glycidyl ethers which can be used as the ether reactants in the process of this invention are as follows:

3-methoxy-1,2-epoxypropane
3-propoxy-1,2-epoxypropane
3-hexyloxy-1,2-epoxypropane
3-heptyloxy-1,2-epoxypropane
3-decyloxy-1,2-epoxypropane
3-(dimethylphenoxy)-1,2-epoxypropane
3-(tert-octadecyloxy)-1,2-epoxypropane
3-(nonylphenoxy)-1,2-epoxypropane
3-(2-propylheptyloxy)-1,2-epoxypropane
3-(n-hexadecyloxy)-1,2-epoxypropane
3-(2,4-dinonylphenoxy)-1,2-epoxypropane
3-(n-octadecyloxy)-1,2-epoxypropane
3-(decylphenoxy)-1,2-epoxypropane
3-(tridecyloxy)-1,2-epoxypropane
3-(2-nonyl-1-naphthoxy)-1,2-epoxypropane Illustrative examples of some of the glycidyl thioethers which can be used as the ether reactant in the process of this invention are as follows:

3-methylthio-1,2-epoxypropane
3-ethylthio-1,2-epoxypropane
3-butylthio-1,2-epoxypropane
3-octylthio-1,2-epoxypropane
3-nonylthio-1,2-epoxypropane
3-(n-hexadecylthio)-1,2-epoxypropane
3-(2,4-dinonylphenylthio)-1,2-epoxypropane
3-(n-octadecylthio)-1,2-epoxypropane
3-(2-butyloctylthio)-1,2-epoxypropane
3-(tridecylthio)-1,2-epoxypropane
3-[(2-ethylheptyl)phenylthio]-1,2-epoxypropane
3-(n-pentadecylthio)-1,2-epoxypropane
3-(3-butylphenylthio)-1,2-epoxypropane The glycidyl ether and thioether reactants used in the process of this invention can be readily prepared from the corresponding chlorohydrins, e.g., 1-alkoxy-3-chloro-2-propanol, 1-alkaryloxy-3-chloro-2-propanol, 1-alkylthio-3-chloro-2-propanol, and 1-alkarylthio-3-chloro-2-propanol. The chlorohydrin is dehydrochlorinated in an aqueous alkaline solution, preferably in the presence of a lower dialkyl sulfoxide. The chlorohydrin can be readily prepared from a long-chain alcohol and epichlorohydrin by reacting substantially 1 mole each of the alcohol and epichlorohydrin in the presence of an acid-type catalyst such as boron trifluoride, zinc chloride, etc.

Some examples of epoxide or oxirane compounds that are suitable for reaction with the 2,4,6-trihalo-sym-triazine compound are for example, ethylene oxide, and alkyl derivatives thereof such as propylene oxide, isobutylene oxide, 1,2-epoxybutane, 2,3-epoxybutane, 1,2-epoxypentane, 2,3-epoxypentane, 2,3-epoxyhexane, 1,2-epoxyhexane, 1,2-epoxyheptane, 2,3-epoxy-3-ethylpentane, 1,2-epoxy-4-methylpentane, 1,2-epoxy-2-ethylhexane, 1,2-epoxy-2,4-trimethylpentane, 1,2-epoxy-2,3-dimethylheptane; haloalkyl-substituted alkylene oxides such as epichlorohydrin, epibromohydrin, epiiodohydrin, epifluorohydrin, 1,2-epoxy-4-bromobutane, 2,3-epoxy-4-bromobutane, 1,2-epoxy-3,4-dibromobutane, 2,3-epoxy-1-bromopentane, 3,4-epoxy-2-chlorohexane, 1,2-epoxy-3,3,3-trifluoropropane; the alkenyl-substituted oxide rings such as 3,4-epoxy-4-methyl-1-pentene, 1,2-epoxy-3-butene and 3,4-epoxy-1-butene; aryl-substituted alkylene oxide rings such as (epoxyethyl)benzene, (1,2-epoxy-1-methylethyl)benzene, (3-chloro-1,2-epoxypropyl)benzene; 1,2-epoxytridecane, 1,2-epoxytetradecane, 1,2-epoxyhexadecane, 1,2-epoxyoctodecane, 1,2-epoxyeicosane, 1,2-epoxy-3-cyclohexylpropane, 1,2-epoxy-3-cyclobutylpropane, 1,2-epoxy-4-(4-n-octyl-3-cyclohexenyl)butane, 1,2-epoxyhenecosane, 1,2-epoxydocosane, 1,2-epoxytetracosane, 1,2-epoxypentacosane, and 1,2-epoxyhexacosane.

Examples of products obtained by reacting a cyanuryl trihalide with one of the above identified expoxide compounds to replace one halogen atom in the triazine ring are:

2,4-dibromo-6-(2,3-dichloropropoxy)-sym-triazine obtained by reacting 2,4,6-tribromo-sym-triazine with epichlorohydrin;
2,4-dichloro-6-(2-chloroethoxy)-sym-triazine obtained by reacting 2,4,6-trichloro-sym-triazine with ethylene oxide;
2,4-dibromo-6-(2-bromoöctyloxy)-sym-triazine obtained by reacting 2,4,6-tribromo-sym-triazine with 1,2-epoxyoctane;
2,4-dichloro-6-(2-chloroöctadecyloxy)-sym-triazine obtained by reacting 2,4,6-trichloro-sym-triazine with 1,2-epoxyoctadecane;
2,4-dibromo-6-(2-bromodocosyloxy)-sym-triazine obtained by reacting 2,4,6-tribromo-sym-triazine with 1,2-epoxydocosane;
2,4-dichloro-6-(2-chloro-2-phenylethoxy)-sym-triazine obtained by reacting 2,4,6-trichloro-sym-triazine with epoxyethylbenzene;
2,4-dibromo-6-(2-bromo-3-naphthylpropoxy)-sym-triazine obtained by reacting 2,4,6-tribromo-sym-triazine with 1,2-epoxy-3-naphthylpropane; and
2,4-dichloro-6-(2-chloro-3-biphenylylpropoxy)-sym-triazine obtained by reacting 2,4,6-trichloro-sym-triazine with 1,2-epoxy-3-biphenylylpropane.

Examples of products obtained by reacting a trihalo-sym-triazine with a sufficient amount of an epoxide to react with and replace two halogen atoms therefrom are:

2-chloro-4,6-bis(2-chloropropoxy)-sym-triazine obtained by reacting 2,4,6-trichloro-sym-triazine with 1,2-epoxypropane;
2-bromo-4,6-bis(2-bromododecyloxy)-sym-triazine obtained by reacting 2,4,6-tribromo-sym-triazine with 1,2-epoxydodecane;
2-chloro-4,6-bis(2-chloroöctadecyloxy)-sym-triazine obtained by reacting 2,4,6-trichloro-sym-triazine with 1,2-epoxyoctadecane; and 2-bromo-4,6-bis(2-bromotetracosyloxy)-sym-triazine obtained by reacting 2,4,6-tribromo-sym-triazine with 1,2-epoxytetracosane.

Examples of products obtained by reacting a 2,4,6-trihalo-sym-triazine with a glycidyl ether include:

2,4-dichloro-6-(2-chloro-3-ethoxypropoxy)-sym - triazine obtained by reacting 2,4,6-trichloro-sym-triazine with 1,2-epoxy-3-ethoxypropane;

2,4-dibromo-6-(2-bromo-3-hexadecyloxypropoxy) - sym-triazine obtained by reacting 2,4,6-tribromo-sym-triazine with 1,2-epoxy-3-hexadecyloxypropane;

2,4-dichloro-6-(2-chloro-3-phenoxypropoxy)-sym-triazine obtained by reacting 2,4,6-trichloro-sym-triazine with 1,2-epoxy-3-phenoxypropane;

2-bromo-4,6-bis(2-bromo-3-tricosyloxypropoxy)-sym-triazine obtained by reacting 2,4,6-tribromo-sym-triazine with 1,2-epoxy-3-tricosyloxypropane;

2-chloro-4,6-bis(2-chloro-3-isopropoxypropoxy)sym-triazine obtained by reacting 2,4,6-trichloro-sym-triazine with 1,2-epoxy-3-isopropoxypropane; and 2-chloro-4,6-bis(2-bromo-3 - naphthyloxypropoxy) - sym-triazine obtained by reacting 2-chloro-4,6-dibromo-sym-triazine with 1,2-epoxy-3-naphthyloxy propane.

As above indicated, it is within the realm of this invention to prepare derivatives of halotriazine compounds in which a different halohydrocarbyloxy group is attached to each of two carbon atoms of the triazine ring so substituted. Examples of such compounds are:

2-chloro-4-(2-chloro-3-bromopropoxy)-6-(2 - chloro - 3-phenoxypropoxy)-sym-triazine obtained by reacting 2,4,6-trichloro-sym-triazine with epibromohydrin and then with 1,2-epoxy-3-phenoxypropane;

2-bromo-4-(2-bromoöctadecyloxy)-6-(2-bromopropoxy)-sym-triazine obtained by reacting 2,4,6-tribromo-sym-triazine with 1,2-epoxyoctadecane and then with propylene oxide; and 2-chloro-4-(2-chloro-2-ethylhexyloxy)-6-(2 - chloro - 3-hexyloxypropoxy)-sym-triazine obtained by reacting 2,4,6-trichloro-sym-triazine with 1,2-epoxy-2-ethylhexane and then with 1,2-epoxy-3-hexyloxypropane.

The halohydrocarbyloxyl symmetrical triazine compounds of the above defined types having 1 or 2 halogen atoms still attached to the carbon atoms of the triazine ring are recovered as such and used in sizing compositions.

The reaction of the epoxyalkane or glycidyl ether reactant with the cyanuryl trichloride or tribromide takes place readily by contacting either reactant with the cyanuryl trihalide in an appropriate solvent or diluent which will not react with either of the reactants and is a good solvent for both, advantageously in the presence of a catalyst, and then stirring the resulting reaction mixture until the desired product has been formed. Although reaction may take place slowly at temperatures as low as 25° C., ordinarily a temperature of about 50 to 80° C. is used to carry out the reaction. Preferably the temperature is maintained below 150° C. and usually below 125° C. since the more elevated temperatures appear to cause decomposition of the products. Any solvent or diluent which has a convenient boiling point at the temperature of reaction and which will not react with either of the reactants can be used. Such solvents or diluents are for example acetonitrile, tetrahydrafuran, dioxane, ether, and hydrocarbon solvents such as xylene, toluene, hexane, and the like.

Ordinarily, the reaction of this invention is conducted at atmospheric pressures while superatmospheric pressures can be used and in fact, may be necessary in systems wherein lower molecular weight epoxide compounds are used.

The epoxyalkane or the glycidyl ether reactants and the cyanuryl trihalide reactants are preferably reacted in approximately stoichiometric proportions; however, care is taken to insure that not more than 2 molar equivalents of the epoxyalkane or glycidyl ether reactant is used per mole of the cyanuryl trihalide reactant since it is desirable to leave at least one and preferably two halogen atoms bonded to the carbon atoms of the triazine nucleus when the products are to be used in sizing compositions.

The reaction of the epoxyalkane or the glycidyl ether reactant with the cyanuryl trihalide is primarily an addition type reaction resulting in the formation of a single product. The substituted halotriazine product is usually recovered from the reaction mixture by first removing the unconverted reactants and by-products by distillation under reduced pressure, filtration, solvent extraction, etc. and then purifying the residue. Conventional purification techniques including serial redissolving the residue in the solvent, decolorizing the mixture with charcoal, filtering the mixture, and allowing the product to crystallize or aspirating off the solvent and possibly distilling the product in vacuo.

The epoxy compounds and the glycidyl ethers react with the cyanuryl trihalide reactants with comparative ease. The mixture is usually heated to a higher temperature on the order of 80 to 130° C. to insure complete reaction, but such heating is not necessary where it is evident by well known chemical means that the reaction is complete. The higher reaction temperatures are generally used to promote reaction of materials of higher molecular weight.

The reaction of the epoxyalkane and glycidyl ether reactants with the cyanuryl trihalide reactants is generally conducted in the presence of an appropriate catalyst. The use of catalyst is preferred in that reaction time is thereby substantially decreased, use of a lower reaction temperature is facilitated, and yields of the desired product are materially improved. As catalyst there may be employed such compounds as Friedel-Crafts catalysts, e.g., titanium tetrachloride, zirconium tetrachloride, aluminum chloride, ferric chloride, boron trifluoride, tin tetrachloride, magnesium chloride, and zinc chloride. However, the reaction does proceed slowly without a catalyst. Zinc chloride and ferric chloride are preferred catalysts.

The compounds of the present invention are stable, usually high boiling materials which range from viscid liquids to waxy or crystalline solids. They are particularly valuable as an essential active ingredient in paper treating compositions for treating of paper products which include cardboard and other thicker papers made from one or more plies of paper stock. They are also active as biological toxicants, particularly as herbicides.

The compounds prepared by the process of this invention having halohydrocarbyloxyl substituents having from 12 to 28 carbon atoms are useful as sizing agents for textiles, etc., but are particularly valuable as such for paper sizes since the substituted halotriazine compounds have pronounced hydrophobic properties. It is preferred for the application of these materials to fibrous products such as textiles, paper and paper pulp to utilize dispersing agents or wetting agents which may have the additional property of remaining in solution in the water without being absorbed by the fiber at least to a considerable extent during application.

The invention is further illustrated by but not limited to the following specific examples.

EXAMPLE 1

To 32.7 g. (0.10 mole) of n-octadecyl glycidyl ether there was added 27.6 g. (0.15 mole) of cyanuryl chloride in 50 ml. of acetonitrile. The mixture was stirred and heated to reflux (about 85° C.), and then about 0.5 g. of zinc chloride was added. The mixture was heated and stirred for 20.5 hours. Acetonitrile was removed under aspirator vacuum to about 100° C. The residue was cooled to room temperature and then 100 ml. of hexane was added, with stirring. The excess unreacted cyanuryl chloride (9.0 g.) and zinc chloride were filtered off. The filtrate was heated to 110° C. under aspirator vacuum to remove hexane, leaving a light orange oil. The light orange oil product was purified by removal by sublimation of additional cyanuryl chloride, and redissolving the residue in hexane, treating it with decolorizing charcoal, filtering off the charcoal, and aspirating off the hexane as before, to leave as residue 31.2 g. of 2,4-dichloro-6-(2-chloro-3-octadecyloxypropoxy)-s-triazine, which analyzed as containing 7.75% nitrogen as compared with 8.22% nitrogen, the calculated value.

EXAMPLE 2

In a 300 ml. bomb reactor there were placed 36.9 g. (0.20 mole) of cyanuryl chloride and 0.5 g. of zinc chloride with 50 ml. of acetonitrile containing 17.5 g. (0.3 mole) of propylene oxide. The bomb was sealed and heated and rocked for approximately 12 hours at 100°–110° C. The bomb reactor was emptied, the contents filtered, and then aspirated to remove acetonitrile. The residue was distilled giving 21.5 g. of 2,4-dichloro-6-(2-chloropropoxy)-s-triazine; $n_D^{25}$ 1.5256.

The above reaction was also run at atmospheric pressure to give 2,4-dichloro-6-(2-chloropropoxy)-sym-triazine, B.P. 114°–118° C./0.2 mm., $n_D^{25}$ 1.5297, analyzing as containing 30.43% carbon, 2.80% hydrogen, 17.28% nitrogen, and 43.43% chlorine as compared with 29.7% carbon, 2.50% hydrogen, 17.33% nitrogen, and 43.8% chlorine, the calculated values for $C_6H_6Cl_3N_3O$.

To 15.3 g. of 2-(2-chloropropoxy)-4,6-dichloro-sym-triazine in benzene there was added sodium methoxide in methanol (7.0 g. of sodium methoxide in 35 ml. of methanol) to convert the product to trimethyl cyanurate; distillation gave propylene oxide as solution which was collected and analyzed for oxirane content, which indicated that 12.7% yield was isolated.

The benzene was distilled off leaving a slurry which was cooled, filtered, and washed three times with water. Recrystallization from water gave long needle-like crystals, M.P. 133.5°–135° C. The melting point of the trimethyl cyanurate was identical to the melting point of trimethyl cyanurate prepared by another method. The melting point of a mixture of the two products was the same, i.e., 133.5 to 135° C.

EXAMPLE 3

To 210 ml. of a solution of 36.9 g. of cyanuryl chloride in acetonitrile stirred at 70° under a Dry Ice condenser there was added ethylene oxide entrained in a stream of nitrogen. When 12.8 g. of ethylene oxide had been added, the temperature was 69° in the boiling mixture. When little reaction occurred in 30 min., about 0.1 g. anhydrous zinc chloride was added, and after another 30 min., 0.1 g. anhydrous ferric chloride was added and heating under reflux continued for twenty hours. The solution was concentrated by distillation and the solvent replaced with carbon tetrachloride, from which a total of 24.6 g.(67% recovery) of cyanuryl chloride crystallized in three crops.

The material remaining in solution was distilled in vacuo and the lower boiling material redistilled, mainly at 102–104°/0.1 mm. $n_D^{25}$ 1.5404. Analysis showed it to contain 26.78% carbon, 2.09% hydrogen, 17.78% nitrogen and 47.51% chlorine compared to the values calculated for 2,4-dichloro-6-(2-chloroethoxy)-sym-triazine of 26.3% carbon, 1.76% hydrogen, 18.4% nitrogen and 46.5% chlorine.

From the first distillation, a fraction boiling at 134–195° (dec.3/0.3–0.5 mm. crystallized and recrystallization from dioxane and then three times from carbon tetrachloride gave colorless crystals, M.P. 109.5–111° containing 33.51% carbon, 3.16% hydrogen, 22.11% nitrogen, and 28.04% chlorine corresponding to 33.5% carbon, 3.21% hydrogen, 22.3% nitrogen and 28.3% chlorine calculated for $C_7H_8Cl_2N_4O_2$.

The substituted-halo-sym-triazines are particularly useful as sizing agents for paper, but are also good water proofing agents for cotton and other textiles.

What is claimed is:

1. A method which comprises contacting and reacting a 2,4,6-trihalo-sym-triazine having the halogen atoms selected from the group consisting of chlorine and bromine with an epoxide compound having a formula selected from the group consisting of

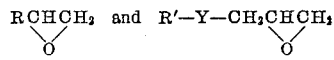

wherein R is selected from the group consisting of hydrogen, alkyl radicals having from 1 to 22 carbon atoms, aryl radicals having from 6 to 12 carbon atoms; and alkaryl and aralkyl radicals having from 7 to 24 carbon atoms; Y is a chalcogen element having an atomic weight of from 16 to 33; and R' is selected from the group consisting of alkyl radicals having from 1 to 22 carbon atoms, aryl radicals having 6 to 12 carbon atoms, and alkaryl and aralkyl radicals having from 7 to 24 carbon atoms in the presence of a catalytic amount of a Friedel-Crafts catalyst, and recovering from the resulting reaction mixture a compound having a formula selected from the group consisting of

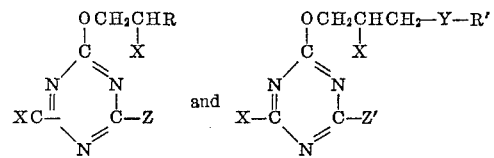

wherein R and R' are as defined above, X is selected from the group consisting of bromine and chlorine; Z is selected from the group consisting of X and the radical

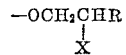

and Z' is selected from the group consisting of X and the radical

wherein R', X, and Y are as defined above.

2. A method according to claim 1 wherein the 2,4,6-trihalo-sym-triazine is cyanuryl chloride, and the epoxide compound has the formula

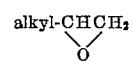

wherein the alkyl radical has from 1 to 22 carbon atoms, and recovering from the resulting reaction mixture a compound of the formula

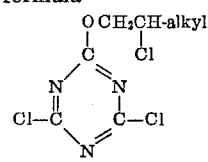

wherein alkyl is as defined above.

3. A method according to claim 1 wherein the 2,4,6-trihalo-sym-triazine is cyanuryl chloride and the epoxide compound has the formula

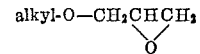

wherein the alkyl radical has from 1 to 22 carbon atoms, and recovering from the resulting reaction mixture a compound having the formula

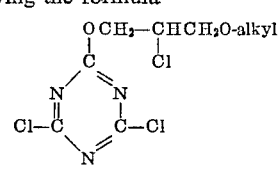

wherein alkyl is as defined above.

4. A method which comprises contacting and reacting cyanuryl chloride with propylene oxide in the presence of a catalytic amount of zinc chloride, and recovering from the resulting reaction mixture 2,4-dichloro-6-(2-chloropropoxy)-sym-triazine.

5. A method which comprises contacting and reacting cyanuryl chloride with 1,2-epoxy-3-octadecyloxypropane in the presence of a catalytic amount of the zinc chloride, and recovering from the resulting reaction mixture 2,4-dichloro - 6 - (2-chloro-3-octadecyloxypropoxy)-sym-triazine.

References Cited
UNITED STATES PATENTS 3,214,325   10/1965   Gaertner _____ 260—248

HENRY R. JILES, *Primary Examiner.*

J. M. FORD, *Assistant Examiner.*